(12) United States Patent
Fryska et al.

(10) Patent No.: US 9,709,109 B2
(45) Date of Patent: Jul. 18, 2017

(54) PREVENTING CARBON AO MIGRATION BY LIMITING SURFACE POROSITY

(71) Applicant: Honeywell International Inc., Morristown, NJ (US)

(72) Inventors: Slawomir T. Fryska, Granger, IN (US); Mark L. La Forest, Granger, IN (US); Allen H. Simpson, Buchanan, MI (US); Peter Franz Braunisch, Hamburg (DE)

(73) Assignee: Honeywell International Inc., Morris Plains, NJ (US)

( * ) Notice: Subject to any disclaimer, the term of this patent is extended or adjusted under 35 U.S.C. 154(b) by 54 days.

(21) Appl. No.: 14/455,259

(22) Filed: Aug. 8, 2014

(65) Prior Publication Data

US 2015/0034432 A1    Feb. 5, 2015

Related U.S. Application Data

(63) Continuation of application No. 12/323,397, filed on Nov. 25, 2008, now Pat. No. 8,801,981.

(51) Int. Cl.
*F16D 65/12* (2006.01)
*F16D 69/02* (2006.01)
(Continued)

(52) U.S. Cl.
CPC ........ *F16D 65/126* (2013.01); *C04B 35/6267* (2013.01); *C04B 35/83* (2013.01);
(Continued)

(58) Field of Classification Search
CPC .................................................... F16D 65/126
See application file for complete search history.

(56) References Cited

U.S. PATENT DOCUMENTS 5,686,144 A    11/1997    Thebault et al.
5,952,249 A    9/1999    Gibson et al.
(Continued)

FOREIGN PATENT DOCUMENTS

GB    2148187    5/1985
WO    2004050319    6/2004
(Continued)

OTHER PUBLICATIONS

Morgan ("Carbon fibers and their composites" ch. 14, 2005.*
(Continued)

*Primary Examiner* — Larry Thrower
(74) *Attorney, Agent, or Firm* — Shumaker & Sieffert, P.A.

(57) ABSTRACT

In the manufacture of carbon-carbon composite brake discs, migration of anti-oxidant substances into the friction surfaces is prevented by limiting or eliminating surface porosity in the carbon-carbon composite brake materials. The method includes infusing a suitable resin into pores in surface layers of the carbon-carbon composite disc and then charring the resin-infused disc to convert the resin in the pores to pyrolytic carbon. The resin may be infused into the carbon disc by submerging the disc in a molten resin. Prior to submerging the disc in the molten resin, the disc may subjected to a vacuum to remove air from the pores. While the disc is submerged in the molten resin, the pressure in the pressurizable vessel may increased to force the molten resin into the open porosity of the disc.

10 Claims, 1 Drawing Sheet

(51) Int. Cl.
*C04B 35/626* (2006.01)
*C04B 35/83* (2006.01)

(52) U.S. Cl.
CPC ........ *F16D 69/023* (2013.01); *C04B 2235/48* (2013.01); *C04B 2235/616* (2013.01); *C04B 2235/95* (2013.01); *F16D 2200/0052* (2013.01); *F16D 2250/0038* (2013.01)

(56) References Cited

U.S. PATENT DOCUMENTS

| | | |
|---|---|---|
| 7,118,805 B2 | 10/2006 | Walker et al. |
| 7,160,618 B2 | 1/2007 | Walker et al. |
| 2007/0199626 A1 | 8/2007 | Diss et al. |
| 2008/0090064 A1 | 4/2008 | James et al. |
| 2010/0129551 A1 | 5/2010 | Fryska et al. |

FOREIGN PATENT DOCUMENTS

| | | | |
|---|---|---|---|
| WO | WO 2004/050319 | * | 6/2004 |
| WO | 2008007401 | | 1/2008 |

OTHER PUBLICATIONS

Response to European Examination Report dated Jun. 24, 2016, from counterpart European Application No. 09176530.5, filed Oct. 15, 2016, 8 pp.

Examination Report from European Application No. 09176530.5-1503, dated Jun. 24, 2016, 4 pp.
Reply to communication from the Examining Division, from counterpart EP Application No. 09176530.5, dated May 4, 2011, 7 pages.
European Examination Report from counterpart EP Application No. 09176530.5, mailed Feb. 3, 2011, 3 pages.
European Search Report from counterpart EP Application No. 09176530.5, mailed Feb. 9, 2010, 3 pages.
Reply to communication from the Examining Division, from counterpart EP Application No. 09176530.5, dated Jun. 23, 2010, 2 pages.
European Examination Report from counterpart EP Application No. 09176530.5, mailed Feb. 22, 2010, 5 pages.
Morgan, "Carbon fibers and their composites" Chapter 14, CRC Press, 2005 (pp. 551-582).
Ponslet et al. "Carbon-Carbon Composite Closeout Frames for Space Qualified, Stable, High Thermal Conductivity Detector Support Structures," Hytec Inc., May 30, 2000, 41 pages.
Xiong et al. "Friction behaviors of carbon/carbon composites with different pyrolytic carbon textures"; Carbon, 44 (2006), pp. 463-467.
Examination Report from counterpart European Application No. 09176530.5, dated Jun. 29, 2015, 4 pp.
Response to Examination Report dated Jun. 29, 2015, from counterpart European Application No. EP09176530.5, filed Nov. 2, 2015, 4 pp.

* cited by examiner

PREVENTING CARBON AO MIGRATION BY LIMITING SURFACE POROSITY

This application is a continuation of U.S. patent application Ser. No. 12/323,397 by Fryska et al., which was filed on Nov. 25, 2008 and is entitled, "PREVENTING CARBON AO MIGRATION BY LIMITING SURFACE POROSITY." U.S. patent application Ser. No. 12/323,397 by Fryska et al. will issue as U.S. Pat. No. 8,801,981 on Aug. 12, 2014. The entire content of U.S. patent application Ser. No. 12/323,397 by Fryska et al. is incorporated herein by reference.

FIELD OF THE INVENTION

Carbon-carbon composites are commonly used as brake friction materials in the aerospace industry. Carbon-carbon composites provide a good combination of high strength, low weight, and effective friction properties. However, they are vulnerable to oxidation at elevated temperatures. This invention relates to the manufacture of carbon-carbon brake discs. More particularly, this invention relates to brake discs which are coated with antioxidant compositions during the course of their preparation for use in braking systems.

BACKGROUND OF THE INVENTION

In the product of carbon-carbon composite articles, a preform is made with carbon fibers or carbon fiber precursors, in textile form or in the form of loose fibers, and the resulting fibrous matrix is densified, typically, by filling it with a resin which is then carbonized and/or by filling it with chemical vapor. The densification process is generally repeated until the pores in the preform are so narrow that further penetration by densifying agents is impractical.

Antioxidant treatments are required to protect non-friction surfaces of carbon-carbon composite brake friction materials, due to the high operating temperatures of braking systems utilizing these materials. Oxidation may be minimized by a technological process of applying anti-oxidation ("AO") solution to the non-friction surfaces of the brake discs. Unfortunately, the most common AO solutions have a tendency to migrate through the porosity of the carbon-carbon friction material in the presence of atmospheric humidity. This migration leads to contamination by the AO solution of the friction surfaces of the carbon-carbon composite brake materials, thus decreasing the friction properties of the brake.

Combinations of phosphoric acid and various metal phosphates are commonly used for such antioxidant treatments. Unfortunately, these same materials have adverse effect on braking effectiveness. Specifically, they lower friction coefficients of the carbon-carbon composite materials to which they are applied. While this is not a problem on the non-friction surfaces of the brake discs, it is very much a problem when the antioxidant material contacts the friction surfaces thereof. Because conventional antioxidant treatments are virtually invisible on carbon-carbon composites in their cured state, accidental application thereof to the friction surface can go undetected, resulting in adverse performance of the brake friction material.

Currently employed measures to prevent AO migration include (1) limiting the amount of phosphoric acid in the AO solution and (s) using high AO char temperatures. However, both of these methods limit the anti-oxidation effectiveness of the AO solution, and they create technological problems during the manufacturing process.

U.S. Pat. No. 7,160,618 relates to an AO system which is resistant to humid migration. In the present invention, in contrast, migration is avoided no matter what AO system is used. U.S. Pat. No. 7,118,805 and US 2007/0218208 similarly relate to formulating the AO system in such a way that migration would not occur. The present invention allows the use of any AO system. US 2007/0199626 discusses, in paragraphs [0030] to [0032], the established art of creating a carbon-carbon composite material. The use of various resins to densify a precursor matrix is well known in industry, but is not widely practiced because the resultant compose density tends to be low. The low density occurs because carbonizing the resins closes the porosity in the composite body, thereby inhibiting subsequent further densification of the composite body.

SUMMARY OF THE INVENTION

The present invention prevents AO migration by limiting or eliminating surface porosity in the carbon-carbon composite brake materials, thereby removing the possible migration paths.

The present invention provides an improvement in the manufacture of carbon-carbon composite brake discs. The method of this invention includes the steps of infusing phenolic resin or epoxy resin or cyanate ester resin into pores in surface layers of a carbon-carbon composite friction disc; and subsequently charring the resin-infused disc to convert the resin in the pores to pyrolytic carbon. The charring step may be carried out at any convenient temperature, typically at a temperature in the range of 500° C. to 900° C.

In the method of the present invention, the resin may be infused into the carbon-carbon composite friction disc by submerging the disc in a molten resin in a pressurizable vessel so that the molten resin can flow into the open porosity of the disc. Prior to submerging the disc in the molten resin, the disc may subjected to a vacuum, for instance, a vacuum of 10 torr, to remove air from the inner porosity of the disc. While the disc is submerged in the molten resin, the pressure in the pressurizable vessel may increased, for instance, up to 3000 psi, typically, to 30-300 psi, in order to force the molten resin into the open porosity of the disc. Vacuum or pressure may be used alone, or both may be used in order to achieve pore blocking in the present invention.

BRIEF DESCRIPTION OF THE DRAWINGS

The present invention may be more fully understood from the detailed description given below and the drawings that accompany this specification. The drawings are given by way of illustration only, and thus are not limiting of the present invention. The drawings are not necessarily to scale.

DETAILED DESCRIPTION OF THE INVENTION

Figure 1A:
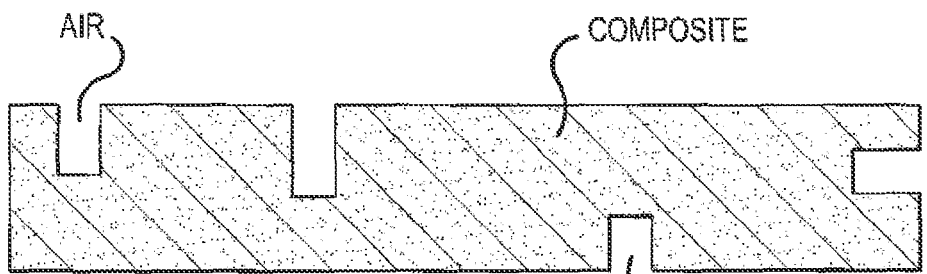
FIG. 1A is a schematic representation of a carbon-carbon composite showing pores open to the atmosphere.

A preferred method of implementing the present invention is to infuse phenolic resin or epoxy resin or cyanate ester resin into the surface layers of carbon-carbon composite friction discs, followed by a char heat treatment to convert the resin to pyrolytic carbon. One advantage of cyanate ester resins is that they cure without the development of gas. One method for infusing the resin into the carbon-carbon composite friction discs is to submerge the disc in a molten resin and then increase the pressure in the pressurizable vessel. This forces the molten resin into the open porosity of the disc. Subsequent char carbonizes the resin in place in the pores. Pyrolytic carbon has very low porosity. Accordingly, the pyrolytic carbon effectively closes possible migration routes for the AO solution.

In accordance with the present invention, at some stage of the manufacturing process, the brake disc is treated with an antioxidant composition. The "working surface" of the brake disc should present the maximum possible frictional properties to the brake pad. The terminology "working surface of the brake disc" refers to that portion of the brake disc that frictionally engages with a brake pad during a braking operation. Accordingly, the present invention contemplates processing the brake disc, before incorporating it into a brake system, to avoid or inhibit the antioxidant composition from reaching the working surface of the disc.

The production of carbon-carbon composite materials, including brake friction materials, has been described extensively in the prior art. One commonly used production method comprises molding a carbon fiber composite with a carbonizable resin, e.g., a phenolic resin, carbonizing the composite "preform", and then densifying the resulting porous material using chemical vapor infiltration (CVI) and/or resin impregnation processes. Another method comprises building up a fiber preform with textile materials and subsequently densifying the preform using a CVI process. Different structural types of carbon (graphitic, glassy, and pyrolytic) comprise the brake disc, which is somewhat porous. Further densification can be accomplished with, e.g., furfuryl alcohol infiltration or through incorporation into the carbon matrix of ceramic additives via infiltration with colloidal ceramics and their subsequent conversion to refractory materials.

Carbon-carbon brake disc friction performance is dictated by the carbon microstructure which arises from the manner in which the brake disc is manufactured. The amount of graphitization, for instance, can dramatically affect frictional and wear properties. Overall brake performance is particularly affected by the individual components, including fibers and types of matrix materials, at the friction surface.

One source of problems with these carbon composites is that they have low resistance to oxidation, by atmospheric oxygen, at elevated temperatures, that is, temperatures of 500° C. (932° F.) or higher. Oxidation not only attacks the surface of the carbon-carbon composites but also enters pores that invariably are present in such structures and oxidizes the carbon fibers adjacent to the pores and surfaces of the pores, thereby weakening the composites.

Exterior surfaces of carbon-carbon composites are therefore sometimes coated with a ceramic material such as silicon carbide to prevent entry of oxidizing agents such, as molecular or ionic oxygen from the atmosphere, into the carbon-carbon composites. Silicon carbide and other antioxidant coatings are described in detail in U.S. Pat. No. 4,837,073. The exterior surfaces of carbon-carbon composites may be, alternatively, coated with a glass-forming seal coat such as a boron or boron/zirconium substance. Borate glasses have also been used from the protection of carbon-carbon composites against oxidation. U.S. Pat. No. 5,208,099 describes antioxidant coatings that are formed from a $SiO_2$—$B_2O_3$ gel and/or sol having a $SiO_2$:$B_2O_3$ molar composition of 60-85:40-15. Borate glass antioxidant compositions are moisture-resistant and oxidation-resistant coatings composed of 40-80 weight-% $B_2O_3$, 5-30 weight-% $SiO_2$, 7-20 weight-% $Li_2O$, and 7-10 weight-% $ZrO_2$ are described in detail in U.S. Pat. No. 5,298,311.

U.S. Pat. No. 6,737,120 (Golecki) relates to carbon fiber or C-C composites that are useful in a variety of applications. Golecki teaches methods of protecting such composites against oxidation by coating them with fluidized-glass type mixtures. The fluidized-glass mixtures are maintained as liquid precursors and are applied to components formed of carbon fiber or C-C composites. Once coated with the precursors, the coated C-C components are heat-treated or annealed for one or more cycles through a series of gradual heating and cooling steps. This creates glass coatings having thicknesses of about 1-10 mils. The thicknesses of the glass coatings may be varied by varying the composition of the fluidized glass precursor mixtures, the number of application cycles, and/or the annealing parameters.

The Golecki patent teaches that the fluidized glass materials may comprise such materials as borate glasses (boron oxides), phosphate glasses (phosphorus oxides), silicate glasses (silicon oxides), and plumbate glasses (lead oxides). These glasses may include phosphates of manganese, nickel, vanadium, aluminum, and zinc, and/or alkaline and alkaline earth metals such as lithium, sodium, potassium, rubidium, magnesium, and calcium and their oxides, and elemental boron and/or boron compounds such as BN, $B_4C$, $B_2O_3$, and $H_3BO_3$. By way of example, Golecki discloses a boron-containing liquid fluidized glass precursor mixture that includes 29 weight-% phosphoric acid, 2 weight-% manganese phosphate, 3 weight-% potassium hydroxide, 1 weight-% boron nitride, 10 weight-% boron, and 55 weight-% water.

U.S. Pat. No. 6,455,159 (Walker and Booker) likewise relates to antioxidant systems for use with carbon-carbon composites and graphitic materials. The Walker and Booker patent has among its objectives the protection of antioxidant-coated carbon-carbon composites or graphites at elevated temperatures up to and exceeding 850° C. (1562° F.), as well as the reduction of catalytic oxidation at normal operating temperatures. Walker and Booker achieve these objectives by employing a penetrant salt solution which contains ions formed from 10-80 wt % $H_2O$, 20-70 wt % $H_3PO_4$, 0.1-25 wt % alkali metal mono-, di-, or tri-basic phosphate, and up to 2 wt % $B_2O_3$. Their penetrant salt solutions also include at least one of $MnHPO_4.1.6H_2O$, $Al(H_2PO_4)_3$, and $Zn_3(PO_4)_2$, in weight-percentages up to 25 wt %, 30 wt %, and 10 wt %, respectively.

The entire contents of U.S. Pat. Nos. 4,837,073, 5,208,099, 5,298,311, 6,737,120, and 6,455.159 are hereby expressly incorporated by reference.

Carbon-carbon composites are generally prepared from carbon preforms. Carbon preforms are made of carbon fibers, formed for instance of pre-oxidized polyacrylonitrile (PAN) resins. These fibers can be layered together to form shapes, such as friction brake discs, which shapes are then heated and infiltrated with methane or another pyrolyzable carbon source to form the C-C composite preforms. Carbon-carbon composites useful in accordance with the present invention typically have densities in the range of from about 1.6 g/cm$^3$ through 1.9 g/cm$^3$. Methods of manufacturing C-C composites are generally well known to those skilled in the art. A good reference in this area is: Buckley et al., *Carbon-Carbon Materials and Composites*, Noyes Publications, 1993. The entire contents of this publication are hereby expressly incorporated by reference.

For purposes of illustration only, the C-C composite brake disc preform may be fabricated from woven fabric panes of pitch-based Amoco P30X carbon fiber tows in a harness satin weave or from a pitch-based Nippon XNC25 in a plain weave. The tows are rigidized with a few weight-% carbon-containing resin, such as epoxy Novolac. The material is then carbonized at a temperature in the range of 800-1000° C. and densified by carbon CVD. The resulting material is then annealed in an inert gas at a temperature in the range of 1600-2600° C. This process creates a C-C composite component that is adaptable for use in high temperature environments when it is properly protected against oxidation. It is understood that the oxidation protective coating system of the present invention is applicable to C-C composite components regardless of how the C-C composite components are fabricated.

The Resins

A variety of commercially available resins may be used to practice the present invention.

For instance, the resin may be a phenolic resin, for instance, a two stage dry phenolic resin, such as a Novolac resin, having a molecular weight of about 3500 to 4000 or having a molecular weight of about 7500 to 9000, or a one stage liquid phenolic resin, such as a Resol resin, having a molecular weight of about 200 to 500.

The resin may be an epoxy resin, for instance, an epoxy resin having a molecular weight of about 450 to 4000.

The resin may be a cyanate ester resin, for instance, formed by polymerizing a compound of the formula $NCOC_6H_5$—$CH_2$—$(NCOC_6H_5$—$CH_2)_n NCOC_6H_5$ where n is a number from 0 to 20. The bonds to the methylene groups which link the benzene rings ($C_6H_5$) can in principle go out to the cyanate groups from the ortho, meta, or para positions Linking typically takes place through the ortho and para positions. The compounds are typically in the form both of oligomer mixtures (with different values of n) and of isomer mixtures (with different linkage patterns, preferably o- or p- for the terminal benzene rings and o-,o- or o-,p- for the nonterminal benzene rings). Such cyanate esters are available commercially, for example, under the designation PRIMASET® from the company Lonza AG, Basle, Switzerland.

Persons skilled in the art will readily recognize resins such as the above that can be used to implement the present invention. The primary qualifications of the resin to be used are that, when molten, is must have a viscosity such that it can be into the open porosity of the surface layers of the disc, and it must be convertible into pyrolytic carbon by charring.

The Drawings

The accompanying drawings may be used to facilitate understanding of the present invention. FIG. 1A is a schematic representation of a carbon-carbon composite showing pores open to the atmosphere.

Figure 1B:
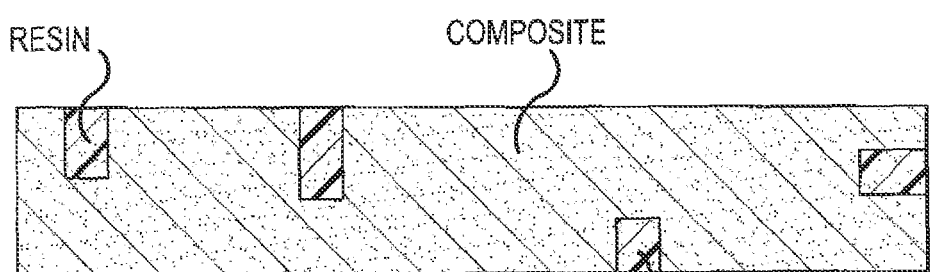
FIG. 1B is a schematic representation of the carbon-carbon composite of FIG. 1A, showing its pores filled with resin.

FIG. 1B is a schematic representation of the carbon-carbon composite of FIG. 1A, showing its pores filled with resin.

Figure 1C:
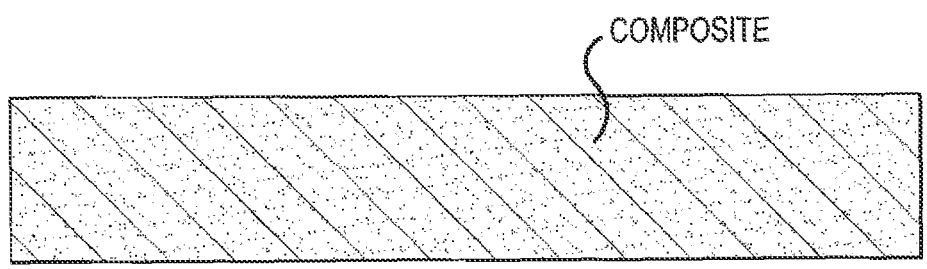
FIG. 1C is a schematic representation of the carbon-carbon composite of FIG. 1B in which the resin in its resin-filled pores has been carbonized, providing a carbon-carbon composite wherein pores formerly open to the atmosphere no longer exist.

FIG. 1C is a schematic representation of the carbon-carbon composite of FIG. 1B in which the resin in its resin-filled pores has been carbonized, providing a carbon-carbon composite wherein pores formerly open to the atmosphere no longer exist. It should be understood that the drawings are not to scale, particularly with respect to the relative size of the pores, and that internal pores in the carbon-carboncomposite are not depicted. However, the drawings portray the intent and mechanics of the invention. The drawings make the point that once the pores in the composite which are open to the air are sealed, there is no capillary path for the liquefied antioxidant composition to migrate into the composite.

EXAMPLES

Example 1

A carbon-carbon composite brake disc preform having an external diameter of 20 inches, an internal diameter of 14 inches, a thickness of 1.5 inches, and a density of 1.7 g/cc is provided. The preform is made from nonwoven PAN fabric. The disc is submerged in a molten phenolic resin in a pressurizable vessel and then pressure in the pressurizable vessel is increased to 200 psi in order to force the molten resin into the open porosity of the surface layers of the disc. Subsequently, the resin-infused disc is charred at 800° C. to convert the resin within the pores of the disc to pyrolytic carbon.

Example 2

A carbon-carbon composite brake disc preform having an external diameter of 18 inches, an internal diameter of 10 inches, a thickness of 1.25 inches, and a density of 1.75 g/cc is provided. The preform is made from chopped pitch fibers. The disc is submerged in a molten epoxy resin in a pressurizable vessel and then pressure in the pressurizable vessel is increased to 50 psi in order to force the molten resin into the open porosity of the surface layers of the disc. Subsequently, the resin-infused disc is charred at 550° C. to convert the resin to pyrolytic carbon.

Example 3

A carbon-carbon composite brake disc preform having an external diameter of 21 inches, an internal diameter of 15 inches, a thickness of 1.75 inches, and a density of 1.5 g/cc is provided. The preform is made from nonwoven PAN fabric. The disc is submerged in a molten mixture of phenolic and epoxy resins in a pressurizable vessel and then pressure in the pressurizable vessel is increased to 150 psi to force the molten resin into the open porosity of the surface layers of the disc. Subsequently, the resin-infused disc is charred at 750° C. to convert the resin to pyrolytic carbon.

Example 4

A carbon-carbon composite brake disc preform having an external diameter of 22 inches, an internal diameter of 12 inches, a thickness of 1.75 inches, and a density of 1.7 g/cc is provided. The preform is made from nonwoven PAN fabric. The disc is placed in a pressurizable vessel, and the vessel is evacuated to 10 torr and held at that vacuum to evacuate air from the internal pores within the disc. The vacuum is then released, and molten phenolic resin is added to the pressurizable vessel. The pressure in the pressurizable vessel is then increased to 300 psi in order to force the molten resin into the open porosity of the surface layers of the disc. Subsequently, the resin-infused disc is charred at 900° C. to convert the resin to pyrolytic carbon.

Example 5

A carbon-carbon composite brake disc preform having an external diameter of 18 inches, an internal diameter of 10 inches, a thickness of 1.25 inches, and a density of 1.75 g/cc is provided. The preform is made from chopped pitch fibers. The disc is placed in a pressurizable vessel, and the vessel is evacuated to 10 torr and held at that vacuum to evacuate air from the internal pores within the disc. The vacuum is then released, and molten cyanate ester resin is added to the pressurizable vessel. The pressure in the pressurizable vessel is then increased to 100 psi in order to force the molten resin into the open porosity of the surface layers of the disc. Subsequently, the resin-infused disc is charred at 650° C. to convert the resin within the pores of the disc to pyrolytic carbon.

Each of the carbon-carbon composite brake discs produced as described above is immersed in a conventional anti-oxidation solution, care being taken to ensure that only the body and sides of the disc are submerged, and that the working surface of the disc is not contacted by the anti-oxidation solution. The anti-oxidation solution-coated discs are then dried in an oven at 100° C. in order to set the anti-oxidant into the non-working surfaces of the discs. Inspection of the working surfaces (friction surfaces) of the discs confirms that no anti-oxidant has reached the friction surfaces.

Persons skilled in the art will readily recognize that additional variations of the above-described implementations may be reached without departing from the spirit and scope of the present invention.

What is claimed is:

1. A brake disc comprising:
    a heat-treated carbon-carbon composite friction disc body having a density of between about 1.6 g/cm$^3$ and about 1.9 g/cm$^3$, wherein the heat-treated carbon-carbon composite friction disc body has undergone heat treatment at a temperature greater than about 1600 Celsius, and wherein the heat-treated carbon-carbon composite friction disc body comprises surface layers that define pores in the surface layers; and
    a pyrolytic carbon formed within at least some of the pores in the surface layers of the heat-treated carbon-carbon composite friction disc body, wherein the pyrolytic carbon substantially seals the pores in the surface layers, and
    wherein the pyrolytic carbon comprises a charred phenolic resin, a charred epoxy resin, or a charred cyanate ester resin.

2. The brake disc of claim 1, further comprising a liquid anti-oxidation solution coated over the heat-treated carbon-carbon composite friction disc body and the pyrolytic carbon formed within the pores, wherein the pyrolytic carbon substantially prevents migration of the anti-oxidation solution into the heat-treated carbon-carbon composite friction disc body.

3. The brake disc of claim 2, wherein the liquid anti-oxidation solution is not coated over a working surface of the heat-treated carbon-carbon composite friction disc body.

4. The brake disc of claim 2, wherein there is no capillary path for the liquid anti-oxidation solution to migrate into the heat-treated carbon-carbon composite friction disc.

5. The brake disc of claim 1, further comprising an anti-oxidant coating over the heat-treated carbon-carbon composite friction disc body and the pyrolytic carbon formed within the pores.

6. The brake disc of claim 1, wherein the pyrolytic carbon is the charred phenolic resin.

7. The brake disc of claim 1, wherein the pyrolytic carbon is the charred epoxy resin.

8. The brake disc of claim 1, wherein the pyrolytic carbon is the charred cyanate ester resin.

9. The brake disc of claim 1, wherein the pyrolytic carbon includes charred phenolic and epoxy resins.

10. The brake disc of claim 1, further comprising an anti-oxidant over at least some surfaces of the heat-treated carbon-carbon composite friction disc body.

* * * * *